US010131036B2

United States Patent
Mase et al.

(10) Patent No.: US 10,131,036 B2
(45) Date of Patent: Nov. 20, 2018

(54) METHOD AND DEVICE FOR MANUFACTURING ELASTIC ABRASIVE METHOD FOR BLASTING THE ELASTIC ABRASIVE INCLUDING METHOD FOR RECYCLING THE ELASTIC ABRASIVE AND DEVICE FOR BLASTING THE ELASTIC ABRASIVE INCLUDING DEVICE FOR RECYCLING THE ELASTIC ABRASIVE

(71) Applicant: FUJI MANUFACTURING CO., LTD, Tokyo (JP)

(72) Inventors: Keiji Mase, Tokyo (JP); Shozo Ishibashi, Tokyo (JP); Yuya Takahashi, Tokyo (JP); Masatoshi Kitagami, Tokyo (JP)

(73) Assignee: FUJI MANUFACTURING CO., LTD., Tokyo (JP)

( * ) Notice: Subject to any disclaimer, the term of this patent is extended or adjusted under 35 U.S.C. 154(b) by 219 days.

(21) Appl. No.: 14/492,543

(22) Filed: Sep. 22, 2014

(65) Prior Publication Data

US 2015/0093969 A1 Apr. 2, 2015

(30) Foreign Application Priority Data

Sep. 30, 2013 (JP) .................................. 2013-205030

(51) Int. Cl.
| | | |
|---|---|---|
| *B24C 9/00* | (2006.01) | |
| *C09K 3/14* | (2006.01) | |
| *B24C 11/00* | (2006.01) | |

(52) U.S. Cl.
CPC .............. *B24C 9/006* (2013.01); *B24C 11/00* (2013.01); *Y02P 70/179* (2015.11)

(58) Field of Classification Search
CPC ......... B24C 11/00; B24C 9/006; Y02P 70/179
(Continued)

(56) References Cited

U.S. PATENT DOCUMENTS 6,146,247 A * 11/2000 Nokubi ..................... B24C 5/06
451/38
6,726,536 B1 * 4/2004 Drake .................. C09K 3/1409
451/39
(Continued)

FOREIGN PATENT DOCUMENTS

| JP | S55-98565 | 7/1980 |
|---|---|---|
| JP | 09-314468 | 12/1997 |

(Continued)

OTHER PUBLICATIONS

JP 2008-264953 A—Nov. 2008—English Machine Translation.*
Corresponding Japanese Application 2013-205030, Japanese Office action dated Jun. 21, 2017, 9 pages.

*Primary Examiner* — Marc Carlson
(74) *Attorney, Agent, or Firm* — Cooper Legal Group LLC

(57) ABSTRACT

To obtain a circulation-type blasting device which enables stable processing for a long period of time even in a case that an elastic abrasive of which abrasive grains are attached to a surface of an elastic core are used.
A circulation-type blasting device is provided with a device for recycling an elastic abrasive for recycling all or a part of elastic abrasive used in a cyclic way, and the device for recycling the elastic abrasive is provided with a mixing unit for mixing recovered abrasives recovered from an abrasive recovery unit and abrasive grains introduced from an abrasive grain supplying unit in a gas flow by introducing the abrasive grains and the recovered abrasive in the gas flow to generate a solid-gas biphase flow, and a combining unit composed of at least one bent space to which the solid-gas biphase flow is introduced.

9 Claims, 10 Drawing Sheets

(58) Field of Classification Search
USPC .......................................................... 51/298
See application file for complete search history.

(56) References Cited

U.S. PATENT DOCUMENTS

| | | | | |
|---|---|---|---|---|
| 7,695,346 | B2 * | 4/2010 | Ishibashi | ............. B24C 1/00 451/330 |
| 8,277,277 | B2 * | 10/2012 | Mase | ............. B24C 1/083 451/2 |
| 8,529,650 | B2 * | 9/2013 | Miyasaka | ............. B24C 1/083 51/302 |
| 8,870,985 | B2 * | 10/2014 | Wang | ............. B24D 3/00 51/295 |
| 9,186,775 | B2 * | 11/2015 | Mase | ............. C09K 3/1409 |
| 2006/0099888 | A1 * | 5/2006 | Ishibashi | ............. B24C 1/00 451/38 |
| 2009/0032507 | A1 * | 2/2009 | Mase | ............. B24C 11/005 219/121.71 |
| 2009/0068930 | A1 * | 3/2009 | Miyasaka | ............. B24C 1/083 451/39 |
| 2009/0130959 | A1 * | 5/2009 | Mase | ............. B24C 1/083 451/38 |
| 2011/0005142 | A1 * | 1/2011 | Mase | ............. B24C 1/08 51/298 |
| 2012/0231704 | A1 * | 9/2012 | Mase | ............. B24C 11/00 451/38 |
| 2014/0329441 | A1 * | 11/2014 | Mase | ............. C09K 3/1409 451/39 |

FOREIGN PATENT DOCUMENTS

| | | | | |
|---|---|---|---|---|
| JP | 2001-207160 | | 7/2001 | |
| JP | 2006-159402 | | 6/2006 | |
| JP | 2008-264953 A | * | 11/2008 | ............. B24C 3/32 |
| JP | 2008-8264953 A | | 11/2008 | |
| JP | 2009-125818 | | 6/2009 | |
| JP | 2009-215327 | | 9/2009 | |

* cited by examiner

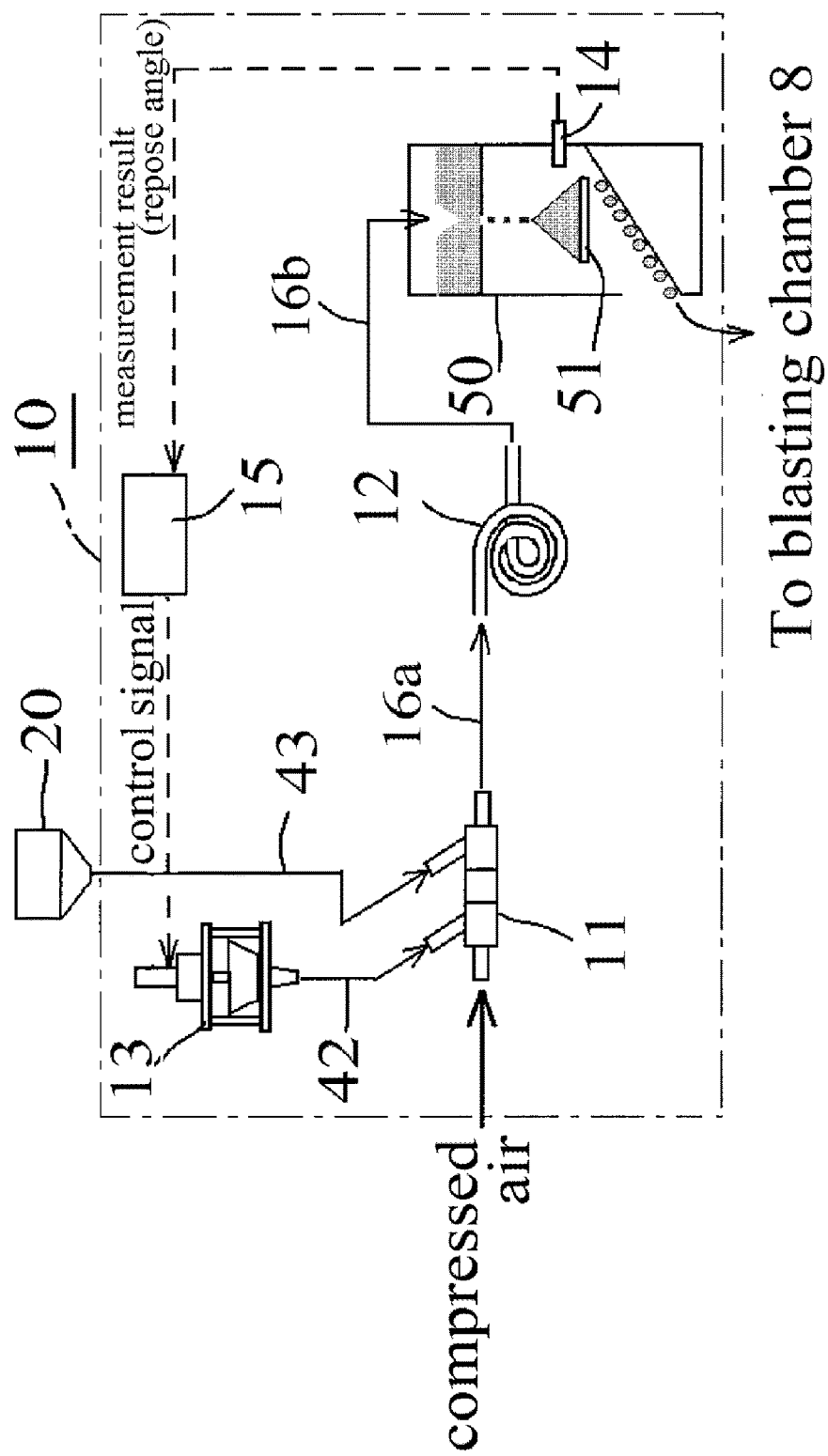

METHOD AND DEVICE FOR MANUFACTURING ELASTIC ABRASIVE METHOD FOR BLASTING THE ELASTIC ABRASIVE INCLUDING METHOD FOR RECYCLING THE ELASTIC ABRASIVE AND DEVICE FOR BLASTING THE ELASTIC ABRASIVE INCLUDING DEVICE FOR RECYCLING THE ELASTIC ABRASIVE

BACKGROUND OF THE INVENTION

1. Field of the Invention

The present invention relates to a method and a device for manufacturing an elastic abrasive, a method and device for blasting, more specifically, relates to a method for manufacturing an elastic abrasive having a structure that abrasive grains are attached to a surface of an elastic core and a device for carrying out the method, and a method and device for circulation-type blasting structurally including the method or the device for manufacturing the elastic abrasive as a method or device for recycling the elastic abrasive.

Note that the "manufacture" of the elastic abrasive in the present invention includes attachment of the abrasive grains to the surface of the unused core, as well as "recycle" by (re)attaching the abrasive grains to the surface of the core of the elastic abrasive on which the abrasive grains are removed from the surface by use (including the core on which abrasive grains are remained).

2. Description of the Related Art

Various elastic abrasives having cores which carry abrasive grains e.g. by kneading the abrasive grains into elastic cores or attaching the abrasive grains to the surfaces of the elastic cores have been proposed (Japanese Patent No. 2,957,492, Japanese Patent Laid-Open No. 2001-207160, Japanese Utility Model Laid-Open No. S55-98565), and a shock caused by collision with a workpiece is absorbed due to elasticity of the core by blasting using this elastic abrasive. As a result, a satin finished surface formed on the surface of the workpiece caused by general blasting is reduced while processings such as polishing, removal of an oxide film and deburring are enabled for the workpiece.

Particularly, in an elastic abrasive using a core suppressing impact resilience for preventing recoiling in collision, mirror finishing which was impossible in the conventional blasting can also be carried out by sliding an ejected elastic abrasive on a surface of the workpiece, which considerably contributes to widen uses of the blasting (Japanese Patent Laid-Open No. 2006-159402).

A structure of such an elastic abrasive may include a structure that abrasive grains are kneaded into a core composed of an elastic material such as a rubber to make the core to carry the abrasive grains (see UM '8565), and structures that abrasive grains are attached to a surface of a core such as a structure that a plant fiber having adhesiveness in its oil and sugar contents is used as a core (Pat '7492) or a structure that a gelatin which exerts adhesiveness and elasticity depending on water content is used as a core ('7160).

Particularly, for manufacture of the elastic abrasive having the structure that the abrasive grains are attached to the surface of the core, the core was introduced into a rotating drum together with abrasive grains and stirred as it is in a case of a core exerting self-adhesiveness such as a plant fiber having adhesiveness in its oil and sugar contents and gelatin as mentioned above, or through coating of the core with an adhesive or an agglutinant in a case using a resin such as polyurethane without self-adhesiveness as a core, so that the abrasive grains are contacted then firmly and densely attached to the surface of the core by colliding, rubbing and pressing the core contacted with the abrasive grains to the inner wall of the drum and other cores by centrifugation. This method is also used for recycling the elastic abrasive with surface from which the abrasive grains were fallen off by use.

In the case that the elastic abrasive including a core which exerts adhesiveness and elasticity by containing water is used among the above-mentioned elastic abrasives, in light of change of the processed state according to the change of the elasticity and adhesiveness of the core by drying with time, it is also proposed that, in a circulation-type blasting device which recovers an abrasive once ejected and re-ejects it, the water content of the elastic abrasive can be adjusted by providing a liquid supplying means which sprays water in a circulation system of the elastic abrasive (Japanese Patent Laid-Open No. 2009-125818).

In the case that blasting is carried out by using the elastic abrasive having a structure that abrasive grains are attached to a surface of the core among the elastic abrasives described as related art, the abrasive grains attached to the surface of the core of the elastic abrasive are fallen off by impact and friction in collision, and the amount of the abrasive grains attached to the surface of the core is decreased as the number of the collision with the workpiece increases.

Hence, in the case that blasting using an elastic abrasive is carried out in a circulation-type blasting device, cutting performance of the elastic abrasive gradually decreases with time as shown in FIG. 10, and there is a large difference in states of the surfaces such as gloss and specularity between a processed state of a workpiece processed by the new elastic abrasive and a processed state of a workpiece processed by using the elastic abrasive repeatedly used.

Even if the elastic abrasive is exchanged for new abrasive at regular intervals in order to prevent the change of the processed state, the cutting amount is temporarily increased immediately after the exchange, however the cutting amount is decreased with time, the cutting amount unstably changes as shown in FIG. 10, and therefore the workpiece still cannot be processed with a certain level of quality.

Thereby, in the case that blasting is carried out by using an elastic abrasive having a structure that abrasive grains are attached to a surface of the core, it is necessary to use batch processing by exchanging the elastic abrasive at each time of use or exchange for a new elastic abrasive in a short period after recycling several times. Therefore, there is a problem that the productivity is considerably decreased because the blasting is interrupted by each exchange.

As presented in '5818, in order to uniform the processed state in blasting using the elastic abrasive comprising the core having elasticity and adhesiveness which is changed according to change of water content, it is proposed to prevent change of the processed state accompanying dry of the elastic abrasive even in a case of recycling use of the elastic abrasive by providing a liquid supplying unit which sprays water into the circulation system of the abrasive in the circulation-type blasting device. Also in relation to the abrasive grains fallen off from the surface of the core, if the elastic abrasive can be similarly recycled in the circulation system of the abrasive, the blasting can be continuously carried out without interrupting the processing.

However, the elastic abrasive with the core from which the abrasive grains are fallen off is recycled by introducing the elastic abrasive to be recycled into the drum together with the abrasive grains and stirring as mentioned above then densely and firmly attaching the abrasive grains not only by attaching new abrasive grains to the core exposed by which the abrasive grains are fallen off, but also by pressing and fixing the new abrasive grains to the surface of the core by giving collision, friction and centrifugal force generated in stirring. Consequently, it is impossible to recycle an elastic abrasive simply by spraying water to the elastic abrasive circulating in the blasting device.

On the other hand, since the above-mentioned drum-shaped manufacturing device for elastic abrasive is large in size, the structure of the device is getting larger in a case that this device is combined with a circulation-type blasting device. Furthermore, since the recycle of the elastic abrasive in the drum-shaped manufacturing device is carried out in the batch style, even if the manufacturing device is combined with the circulation-type blasting device, the blasting device must be eventually stopped for recycling the elastic abrasive.

The present invention has been made to solve the problems in the related art described above, and an object thereof is to provide a method and a device for manufacturing an elastic abrasive having a core to which abrasive grains are densely and firmly attached like the above-mentioned drum-shaped device for manufacturing the elastic abrasive, while enabling the device to be downsized and to continuously manufacture the elastic abrasive, thus enabling to incorporate the process and/or device for recycling the elastic abrasive in the device for circulation-type blasting or the process using the device for circulation-type blasting, thereby the workpiece can be continuously processed for the long time while maintaining the processed state of the workpiece constant in the blasting using the elastic abrasive.

SUMMARY OF THE INVENTION

Means for solving the problems are described below with reference numerals used in the detailed description of the preferred embodiments. These reference numerals are intended to clarify the correspondence between the descriptions in the claims and the descriptions in the detailed description of the preferred embodiments, and it is needless to say that these reference numerals should not be used to restrictively interpret the technical scope of the present invention.

In order to achieve the above described objective, a method and device for manufacturing an elastic abrasive composed of a core made of an elastic material and having adhesiveness at least on a surface of the core and abrasive grains attached to the surface of the core according to the present invention, comprises:

a mixing unit 11 for carrying out a mixing step for mixing the abrasive grains and the core in a gas flow by introducing the abrasive grains and the core together in the gas flow to generate a solid-gas biphase flow; and a combining step for combining the abrasive grains with the surface of the core by introducing the solid-gas biphase flow generated in the mixing step in a mixing unit 11 in a combining unit 12 having a conduit with at least one bent space in embodiments (121, 122 or 123) then passing through the bent space (121, 122 or 123) by propulsive force and/or centrifugal force of the solid-gas biphase flow thereby pressing the abrasive grains to the surface of the core.

The method or device may further comprises:

an inspection means 14 for carrying out an inspection step for measuring an amount of the abrasive grains attached to the surface of the core of the elastic abrasive obtained by the combining unit 12;

an abrasive grain weighing means 131 capable of changing a supplying amount of the abrasive grains to the mixing unit 11; and a controlling means 15 for adjusting the supplying amount of the abrasive grains by controlling the abrasive grain weighing means 131 so that the amount of the abrasive grains to be measured in the inspection step approximates to a predetermined target amount of attachment.

In such a case, the amount of the abrasive grains attached to the surface of the core in the inspection step is measured by measuring a repose angle of the recovered elastic abrasive.

Preferably, the bent space 123 arranged in the combining unit 12 is formed into a curved shape which is steeply changed (i.e., curvature is increased) as extending from an upstream side to a downstream side.

Furthermore, a method and device for blasting according to the present invention comprises the above described method or device for manufacturing the elastic abrasive as a step for recycling the elastic abrasive or the device for recycling the elastic abrasive 10, and the method and device use a circulation-type blasting device composed of a blasting chamber 8 in which an abrasive is ejected, an abrasive recovery unit 20 communicated with a bottom of the blasting chamber 8 and an abrasive ejecting means 30 for ejecting the abrasive in the abrasive recovery unit 20 into the blasting chamber 8 and forming a circulation system of the abrasive for circulating the abrasive from the blasting chamber 8 through the abrasive recovery unit 20 to the abrasive ejecting means 30, and using an elastic abrasive composed of a core made of an elastic material and having adhesiveness at least on a surface of the core and abrasive grains attached to the surface of the core as the abrasive, and comprises a device for recycling an elastic abrasive 10 for recycling the elastic abrasive circulating in the circulation system of the abrasive; and the device for recycling the elastic abrasive 10 includes:

a mixing unit 11 for carrying out a mixing step for mixing abrasive grains from an abrasive grain supplying unit 13 and a recovered abrasive recovered from the abrasive recovery unit 20 in a gas flow by introducing the recovered abrasive and the abrasive grains together in the gas flow to generate a solid-gas biphase flow; and a combining step for combining the abrasive grains with an exposed surface of the core of the recovered abrasive by introducing the solid-gas biphase flow generated in the mixing unit 11 into a combining unit 12 having a conduit with at least one bent space (121, 122 or 123) and passing through the bent space (121, 122 or 123) by propulsive force and/or centrifugal force of the solid-gas biphase flow thereby pressing the abrasive grains to the exposed surface of the core of the recovered abrasive.

The device for recycling the elastic abrasive 10 may be provided outside the circulation system of the abrasive, and the elastic abrasives recovered in the abrasive recovery unit 20 is partially introduced as the recovered abrasives into the device for recycling the elastic abrasive 10 to carry out the mixing step and the combining step, then recycled elastic abrasives obtained through the combining step are returned to the circulation system of the abrasive at any position.

Furthermore, the device for recycling the elastic abrasive 10 may comprise an inspection means 14 for measuring an amount of the abrasive grains attached to the surface of the core of the recycled elastic abrasive obtained through the combining step, an abrasive weighing means 131 capable of changing an amount of the abrasive grains to be introduced to the mixing unit 11, and a controlling means 15 for controlling an introduction amount of the abrasive grains by the abrasive grain weighing means 131 is provided so that the amount of the attached abrasive grains measured by the inspection means 14 approximates to a predetermined target amount of attachment.

In such a case, the amount of the abrasive grains attached to the surface of the core of the recycled elastic abrasive may be measured in the inspection step by measuring a repose angle of the recovered recycled elastic abrasive.

Preferably, the bent space 123 arranged in the combining unit 12 is formed into a curved shape which is steeply changed (i.e., curvature is increased) as extending from an upstream side to a downstream side.

According to the configuration of the present invention described above, by means of the method and device for manufacturing the elastic abrasive of the present invention, the abrasive grains could be evenly attached to the adhesive core without aggregation of the core by mixing the abrasive grains and the core with a mixing unit 11 in which the abrasive grains and the core are introduced in a gas flow to generate a solid-gas biphase flow, and the core to which the abrasive grains are attached in such a way was introduced to a combining unit 12 comprising a conduit having one or more bent spaces (121, 122 or 123), thereby, during passing through the bent spaces (121, 122 or 123) of the combining unit 12, the core to which the abrasive grains are attached e.g. by being collided with the inner wall of the combining unit 12 and other cores by propulsive force and/or centrifugal force of the solid-gas biphase flow, or rotated on the wall in the combining unit 12 while being pressed to the inner wall of the combining unit 12 to enable the abrasive grains to densely and firmly attach to the core.

As a result, there could be provided a device for manufacturing an elastic abrasive considerably downsized compared to a conventional drum-shaped device for manufacturing elastic abrasive, enables to continuously manufacture the elastic abrasive in a non-batch style while obtaining the same elastic abrasive as that manufactured by the conventional drum-shaped device for manufacturing elastic abrasive.

As a result, the device for manufacturing the elastic abrasive of the present invention could be incorporated as a device for recycling an elastic abrasive 10 in a circulation-type blasting device to provide a blasting device 1 which enabled continuous blasting for a long period of time while maintaining a constant accuracy for processing without exchange of the elastic abrasive by incorporating such a device for recycling an elastic abrasive 10 into the circulation-type blasting device to recycle the elastic abrasive circulating in the blasting device.

In a configuration that an inspection means 14 for inspecting an amount of the abrasive grains attached to the core of the elastic abrasive (recycled elastic abrasive) obtained by the combining unit 12, an abrasive grain weighing means 131 for adjusting an amount of the abrasive grains to be introduced to the mixing unit 11, as well as a controlling means 15 which adjusted the abrasive grain weighing means 131 so that the amount of the attached abrasive grains measured in the inspection means 14 was constant were installed, the amount of the attached abrasive grains to the core of the obtained elastic abrasive could always be made constant, and the quality of the obtained elastic abrasive could be uniformed. Additionally, in the blasting device 1 into which such device for manufacturing an elastic abrasive was incorporated as the device for recycling the elastic abrasive 10, unevenness in the processed state could be prevented even if the blasting was continued for a long period of time.

In addition, the exposed area of the adhesive surface of the core is changed depending on the change of the state of the abrasive grains attached to the core. In the case that the amount of the attached abrasive grains is small, the elastic abrasives are likely to be adhered each other, and in the case that the amount of the attached abrasive grains is increased, the elastic abrasives are hardly attached to each other.

Thus, such a state of attachment of abrasive grains could be relatively easily and accurately measured by measuring an angle of inclination (repose angle) of a side face of a cone formed of the elastic abrasive (recycled elastic abrasive) piled in a cone shape.

As the core (recovered abrasive) passing through the bent space arranged in the combining unit 12 moved from an upstream side to a downstream side, its propulsive force or movement speed was decreased, therefore, a centrifugal force acting on the core was decreased with the approach of downstream side, accordingly the force for pressing the core to the inner wall of the combining unit was decreased in the configuration having a bent space 122 curved in a constant curvature as shown in FIG. 4B. However, as mentioned above, in the structure that the bent space arranged in the combining unit 12 was formed into a curved shape which is steeply changed (i.e., increasing a curvature) as extending from the upstream side to the downstream side as shown in FIG. 4C, the decrease of the centrifugal force acting on the core could be suppressed even if the movement speed is decreased. Consequently, the abrasive grains could be more preferably attached to the core.

BRIEF DESCRIPTION OF THE DRAWINGS

The objects and advantages of the invention will become apparent from the following detailed description of preferred embodiments thereof provided in connection with the accompanying drawings in which:

FIG. 2 shows an explanatory drawing of the device for recycling the elastic abrasive;

FIG. 4 shows an explanatory drawing of the combining unit wherein

FIG. 6 shows a schematic view of the abrasive grain-weighing means wherein

DETAILED DESCRIPTION OF THE PREFERRED EMBODIMENTS

Next, the embodiment of the present invention will be described below with reference to the appended drawings.

In the embodiment to be described below, a configuration that a device for manufacturing an elastic abrasive according to the present invention is incorporated as a device for recycling an elastic abrasive in a circulation-type blasting device will be described. However the device for manufacturing the elastic abrasive according to the present invention can be used alone for manufacturing the elastic abrasive without being incorporated into the blasting device.

Elastic Abrasive to be Recycled or the Like

In addition, the elastic abrasive to be manufactured or recycled in the present invention is composed of an elastic core having adhesiveness at least on its surface and abrasive grains attached to the surface of the core. As long as the abrasive has this structure, various materials, sizes, shapes, etc. can be applied, and the abrasive may also be an abrasive in which the abrasive grains are attached to the surface of the core composed of a self-adhesive material like a gelatin and an elastomer, or may be an elastic abrasive in which the abrasive grains are attached to the surface of the core to which adhesiveness is given by coating a surface of a resin of polyurethane etc. with the self-adhesive material.

Also, for the abrasive grains to be used, various abrasive grains can be used. However, as an example, diamond, cBN, silicon carbide, alumina, zircon, high-speed steel, iron-carbon alloy, glass, resin, copper and its alloy, aluminum and its alloy, etc. can be used, and one or a combination of a plurality of them may be used. Furthermore, the grain diameter of the abrasive grain can also be selected from various grain diameters depending upon applications of the desired elastic abrasive and can be selected from a range of 0.05 µm to 1 mm in a median diameter (hereinafter referred to as "D50") as one example, and its shape can also be selected from various shapes such as amorphous shapes, polygons, spherical shapes and cylindrical shapes.

Basic Structure of the Blasting Device

Figure 1A:
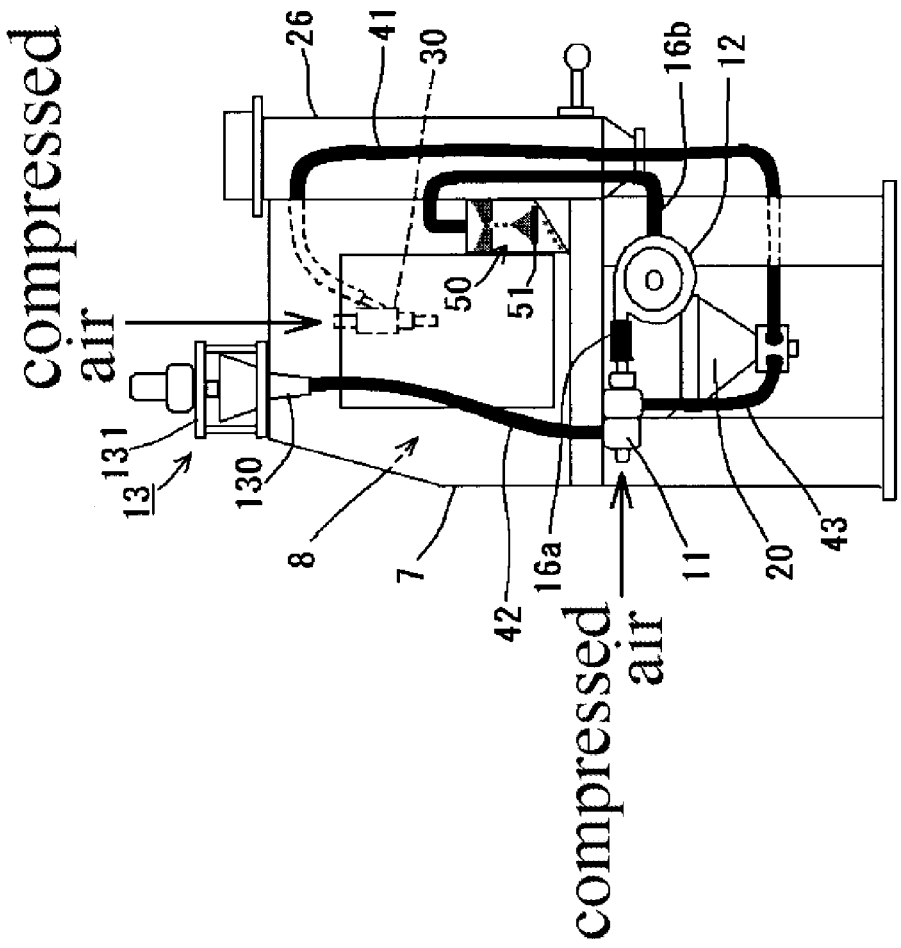
FIG. 1A shows a front view and FIG. 1B shows a side view of the blasting device of the present invention.
Figure 1B:
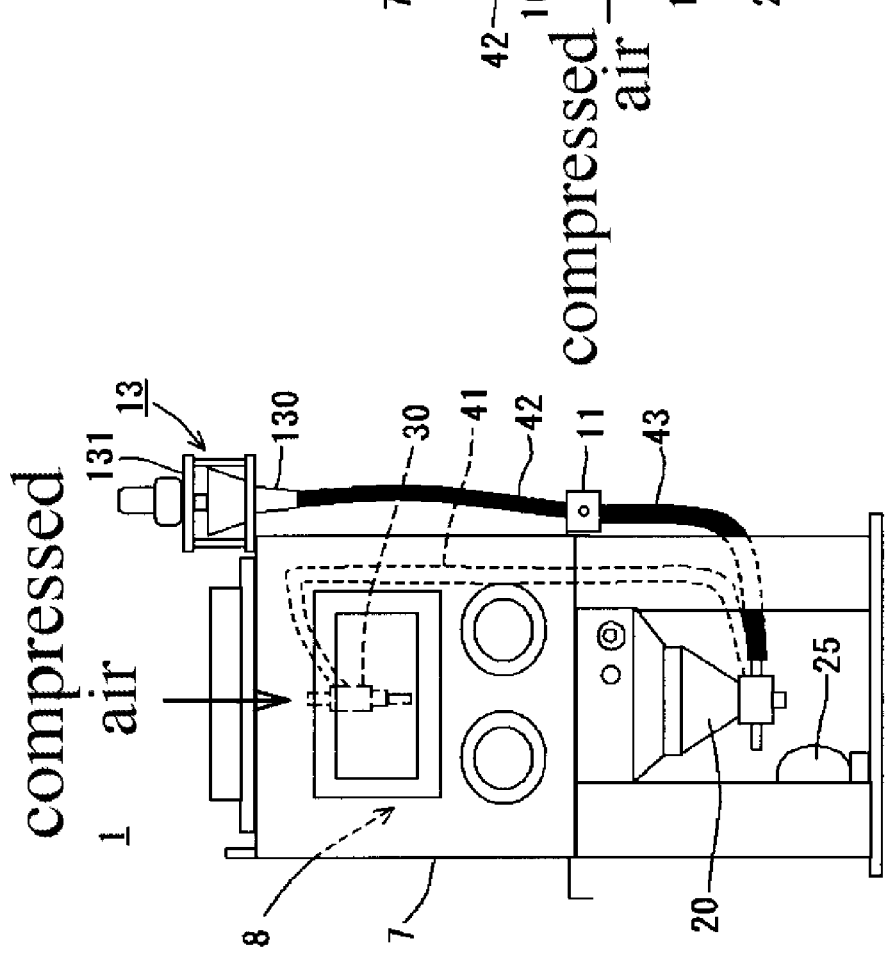

Examples of the structure of the blasting device according to the present invention provided with a device for recycling an elastic abrasive 10 is shown in FIGS. 1A, 1B.

A blasting device 1 shown in FIG. 1 is a circulation-type blasting device provided with a blasting chamber 8 formed in a cabinet 7 in which ejection of the abrasive is carried out, an abrasive recovery unit 20 for recovering the abrasive, which is a recovering hopper communicating with a bottom of the blasting chamber 8, and an abrasive ejecting means 30 which ejects the abrasive in the abrasive recovery unit 20 into the blasting chamber 8, wherein a circulation-type system of the abrasive from the blasting chamber 8 through the abrasive recovery unit 20 and an abrasive supplying tube 41 to the abrasive ejecting means 30 is formed, and the abrasive ejected from the abrasive ejecting means 30 is composed so as to circulate this system and to be re-ejected by the abrasive ejecting means 30.

Although, in the illustrated embodiment, as the abrasive ejecting means 30 which ejects the abrasive in the blasting chamber 8, there is provided a blast gun which ejects the abrasive on a compressed air from a compressed air source (not shown), the ejection of the abrasive is not limited to such an air type, and known various type of abrasive-ejecting means other than acceleration by compressed air can also be adopted, as long as they are dry types capable of ejecting or projecting the abrasive such as a hitting type to hit an abrasive by colliding the abrasive against a rotating impeller and a centrifugation type to eject the abrasive by centrifugal force (collectively referred as "ejection" in the present invention).

A bottom of the blasting chamber 8 for carrying out ejection of the abrasive by the abrasive ejecting means 30 is formed into reverse-pyramid shape so as to have a hopper-shape, thus the abrasive ejected in the blasting chamber 8 is fallen into the hopper-shaped abrasive recovery unit 20.

A baffle plate for classifying the elastic abrasive and dusts is arranged in the blasting chamber 8, the elastic abrasive is recovered in the abrasive recovery unit 20 by the classification through the baffle plate, and the dusts are introduced into a dust collector 26 provided at the back of a cabinet 7 by an exhauster (blower) 25 and collected.

A bottom of the abrasive recovery unit 20 in which the elastic abrasive is recovered is communicated with the abrasive supplying tube 41, and the abrasive supplying tube 41 is communicated with the abrasive ejecting means 30 which is a suction-type blast gun in the illustrated example.

In the present embodiment, the configuration that the elastic abrasive and dusts were classified by the baffle plate was described. However instead of this configuration, the elastic abrasive and dusts may be classified e.g. by employing a cyclone-type abrasive tank as the abrasive recovery unit 20.

Compressed air from the compressed air source (not shown) is introduced into the blast gun 30. By introducing compressed air from the compressed air source into the blast gun 30, the abrasive in the abrasive recovery unit 20 is sucked through the abrasive supplying tube 41 by a negative pressure caused in the blast gun 30 thereby the abrasive can be ejected into the blasting chamber 8 together with compressed air.

Thus, the illustrated circulation-type blasting device 1 is configured so that the abrasive can be circularly used to continue the blasting for a long period of time, because the circulation system of the abrasive in which the abrasive ejected by the abrasive ejecting means 30 is re-introduced into the abrasive ejecting means 30 through the blasting chamber 8 and the abrasive recovery unit 20 then ejected is formed.

Device for Recycling Elastic Abrasive

In the circulation-type blasting device 1 configured as described above, the blasting can be continuously carried out for a long period of time by using the abrasive in a circulative way. However in a case that the elastic abrasive having a structure that the abrasive grains are attached to the surface of the elastic core is used as an abrasive, the abrasive grains attached to the surface of the core fall off by collision with the workpiece, accordingly a cutting ability of the abrasive is gradually lowered by repeatedly using the abrasive in the circulative way, hence even if the processing is carried out while maintaining other processing conditions such as ejection pressure and ejection speed to be constant, the processed state of the workpiece is changed.

Thus, in the blasting device 1 of the present invention, by providing the device for recycling the elastic abrasive 10 for recycling the elastic abrasive circulating in the circulation system of the abrasive mentioned above, the blasting can be continued for a long period of time without changing the processed state even if time passes.

The device for recycling the elastic abrasive is indicated by reference numeral 10 in FIG. 2. The device for recycling the elastic abrasive 10 comprises at least a mixing unit 11 for mixing the recovered abrasive with the abrasive grains and a combining unit 12 for pressing and combining the abrasive grains to the surface of the core of the recovered abrasive in which the exposed part of the core is attached to the abrasive grains by mixing with the mixing unit 11. In the illustrated embodiment, the mixing unit 11 and the combining unit 12 are provided as a flow channel apart from the circulation system of the abrasive.

Furthermore, in the illustrated embodiment, an abrasive grain supplying unit 13 which introduces the abrasive grains into the mixing unit 11 includes an abrasive grain weighing means 131 (see FIG. 5, 6) which can change an amount of the abrasive grains to be introduced. In addition, an inspection means 14 is provided for measuring an amount of the abrasive grains attached to the surface of the core of the recycled elastic abrasive recycled by being combined through the combining unit 12. Furthermore, a controlling means 15 is provided for controlling the abrasive grain weighing means 131 to change the amount of the abrasive grains to be introduced by receiving feedback of a result measured by the inspection unit 14 so that the measured amount of the attached abrasive grains approximates to a predetermined target amount of attachment.

Mixing Unit

In the mixing unit 11 mentioned above, the recovered abrasive to be recycled and the abrasive grains to be attached to the surface of the core of the recovered abrasive are joined or introduced in a gas flow to generate a solid-gas biphase flow, thereby the recovered abrasive and the abrasive grains are mixed in the gas flow, and new abrasive grains are attached to a part of the core exposed by falling off the abrasive grains in the surface of the recovered abrasive.

Figure 3:
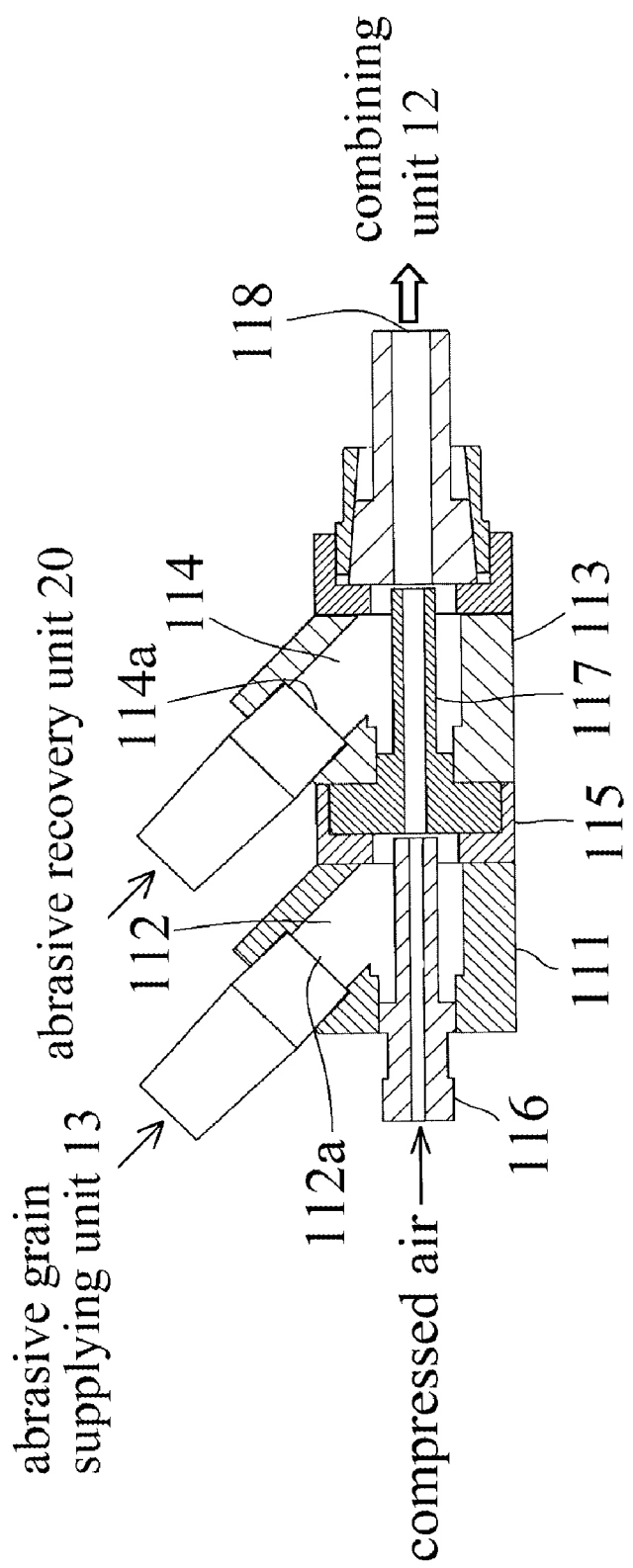
FIG. 3 shows a schematic cross-sectional view of the mixing unit.

As shown in FIG. 3, in this mixing unit 11, a first body 111 in which an abrasive grain sucking chamber 112 is formed is coupled to a second body 113 in which a recovered-abrasive sucking chamber 114 is formed through an intermediate housing 115. Furthermore, the mixing unit 11 is provided with a first air jetting unit 116 and a second air jetting unit 117, and a rear end of the first air jetting unit 116 is communicated with the compressed air source (not shown) and a front end of the first air jetting unit 116 is inserted into the abrasive grain sucking chamber 112 of the first body 111, moreover, a rear end of the second air jetting unit 117 is directed at the front end of the first air jetting unit 116 and an front end the second air jetting unit 117 is inserted into the recovered-abrasive sucking chamber 114.

In addition, an inlet 112a of the abrasive grain sucking chamber 112 is communicated with the abrasive grain supplying unit 13 through an abrasive grain supplying tube 42, and an inlet 114a of the recovered-abrasive sucking chamber 114 is communicated with a bottom of the abrasive recovery unit 20 through a recovered abrasive supplying tube 43.

In the mixing unit 11 configured as mentioned above, compressed air from the compressed air source is introduced into the first air jetting unit 116, the air is ejected from the front end of the first air jetting unit 116 to the rear end of the second air jetting unit 117, then negative pressure is created in the abrasive grain sucking chamber 112 by ejection of the compressed air, the abrasive grains from the abrasive grain supplying unit 13 is sucked into the abrasive grain sucking chamber 112, and joined or introduced in compressed air ejected from the front end of the first air jetting unit 116 then introduced into the second air jetting unit 117.

The mixed flow of the abrasive grains and a gas flow introduced into the second air jetting unit 117 is ejected in the recovered-abrasive sucking chamber 114 toward the outlet 118 of the mixing unit 11, thereby the negative pressure is created in the recovered-abrasive sucking chamber 114, and the elastic abrasives recovered in the abrasive recovery unit 20 are partially introduced into the recovered-abrasive sucking chamber 114 as a recovered abrasive to be recycled and joined or introduced in the gas flow containing the abrasive grains, then ejected from the mixing unit 11.

Thus, the abrasive grains and the recovered abrasive are joined or introduced in a gas flow to generate a solid-gas biphase flow, thereby the abrasive grains and the recovered abrasive can be mixed without aggregation or the like in this solid-gas biphase flow, and new abrasive grains are attached to the surface of the core exposed by falling off the abrasive grains in the recovered abrasive.

As the recovered abrasive, an amount (g/min.) of the elastic abrasive to be introduced in the mixing unit 11 from the abrasive recovery unit 20 per a predetermined time is adjusted to preferably 5-50%, more preferably 10-30% of the amount (g/min.) of the abrasive to be ejected in the blasting chamber per a predetermined time.

In addition, an amount of the abrasive grains to be introduced to the mixing unit 11 is adjusted to preferably 3.0% or less, more preferably 1.0% or less of the amount of the recovered abrasive to be introduced.

In the case that more than 3.0% of abrasive grains are introduced, the abrasive grains more than the amount for covering the entire surface of the recovered abrasive are introduced, therefore a lot of free abrasive grains which cannot be attached to the surface of the recovered abrasive are generated, these free abrasive grains and the elastic abrasive are ejected to the workpiece, resulting in deterioration of the processed state such as formation of a satin finished surface on the surface of the workpiece, then such free abrasive grains are recovered in the dust collector 26 by winnowing in the abrasive recovery unit 20 for discard, thereby the cost of the blasting is increased, and particularly in the case that valuable abrasive grains such as diamond, silicon carbide and cBN are used, economic burden is further increased.

In the illustrated examples, the space in the first body 111 was configured as the abrasive grain sucking chamber 112, and the space in the second body 113 was configured as the recovered-abrasive sucking chamber 114, however on the contrary, the space in the first body 111 may be communicated with the abrasive recovery unit 20 to form a sucking chamber for the recovered abrasive, and the space in the second body 113 may be communicated with the abrasive grain supplying unit 13 to form a sucking chamber for the abrasive grains, and as long as the gas flow containing the abrasive grains and the gas flow containing the recovered abrasive are joined and mixed, and the abrasive grains can be attached to the surface of the recovered abrasive, various changes of the configurations are possible without being limited to the illustrated configurations.

Combining Unit

By passing through the mixing unit 11, new abrasive grains are attached to the surface of the core of the recovered abrasive exposed due to falling off of the abrasive grains with adhesive force of the core. However, the abrasive grains are attached only by the adhesive force of the core, accordingly, the state of attachment between the core and the abrasive grains is still insufficient.

Thus, the recovered abrasive in this state cannot be reused as an elastic abrasive just as it is. In order to render the abrasive tolerable to reuse, the abrasive grains should be firmly combined with the core through adhesion, embedding or the like by pressing the abrasive grains toward the core of the recovered abrasive.

In order to combine the core with the abrasive grains as such, the solid-gas biphase flow generated by the mixing unit 11 is then introduced into a combining unit 12 composed of a conduit having at least one or more bent spaces 121, 122 and 123, and by being passed through the bent spaces 121, 122 and 123, the abrasive grains are pressed toward the surface of the core of the recovered abrasive by propulsive force and/or centrifugal force of the solid-gas biphase flow.

Figure 4A:
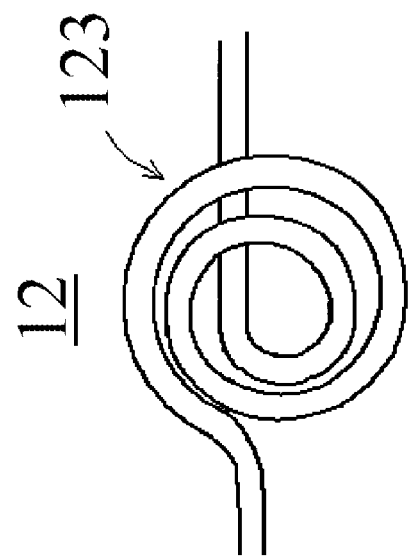
FIG. 4A is an example that bent spaces in a linear shape are provided.

For such a bent space, as shown in FIG. 4A as an example, a part of the combining unit 12 formed by e.g. a SUS pipe or the like may be bent to a right angle to form a bent space 121 so that the recovered abrasive going straight in the combining unit 12 collides with an inner wall of the combining unit 12 at the bent space 121 to press the abrasive grains against the core.

In the case that the bent space is formed by bending the combining unit 12 linearly in such a way, the bending angle is not limited to the right angle as illustrated in the drawing, and it may be bent at an angle of more than or less than right angle. In addition, although the illustrated example shows a case that right-angled bent portions 121 and 121 are given at two portions to form a square C-shape, the combining unit 12 is not limited to this example, and may have only one or plural bent spaces.

Figure 4B:
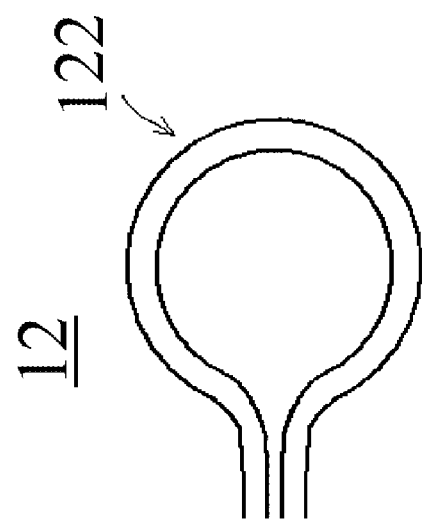
FIG. 4B and FIG. 4C are examples that bent spaces in a curved shape are provided.
Figure 4C:
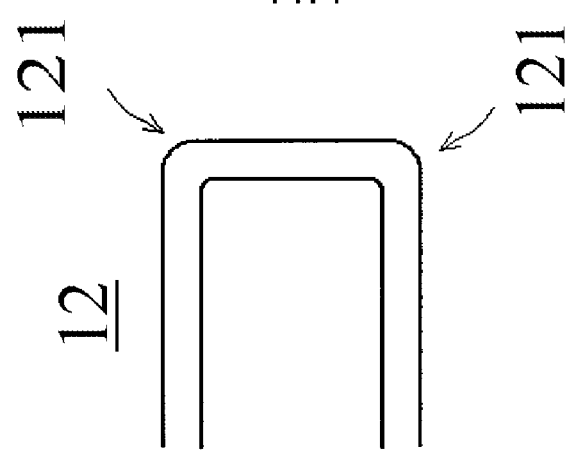

Furthermore, the bent space may be curved as shown in FIG. 4B or FIG. 4C, and in a case that the bent space 122 or 123 in a curved shape is provided in such a manner, the recovered abrasive passing through the bent spaces 122 and 123 e.g. rotates while being pressed to an outer periphery side of the inner wall of the combining unit 12 by centrifugal force, so that the abrasive grains are firmly pressed to the core by propulsive force and/or centrifugal force of the solid-gas biphase flow.

In addition, in a case that such the curved bent space is provided, it may be sequentially formed into a round shape or a spiral shape.

Moreover, in a case that the bent space with the curved shape is provided, preferably, the curved shape of the bent space is steeply changed (i.e., curvature is increased) as extending from an upstream side to a downstream side as shown in FIG. 4C.

Since the recovered abrasive passing through the bent space collides with or contact the inner wall of the combining unit 12 thereby its movement speed is gradually lowered as it moves to the downstream side, the centrifugal force acting on the recovered abrasive is also gradually lowered.

However, since the centrifugal force acting on objects moving in a rotational orbit changes in proportion to a product of a distance from the central axis of the rotation (radius) and squares of the angular velocity, the decrease of the centrifugal force added to the recovered abrasive can be suppressed to enable long-time pressing of the abrasive grains to the core by increasing the change of the curve (curvature) as extending to downstream side according to decrease of the movement speed of the recovered abrasive decreasing as approaching to the downstream side, for example by increasing the angular velocity of the recovered abrasive by forming a spiral shape.

In order to obtain a pressing force required for combining the abrasive grains to the core in any structures, in the case that a linear bent space is formed, the number of the spaces to be formed is adjusted, and, in the case that the curved bent space is formed, the total length (the number of the spiral) of the bent spaces and the like are adjusted.

In such a way, the abrasive grains are pressed to the core of the recovered abrasive while passing through the bent space of the combining unit 12 to obtain a recycled elastic abrasive which were recycled by densely and firmly attaching the abrasive grains to the core of the recovered abrasive from which the abrasive grains were fallen off.

Consequently, the recycled elastic abrasive obtained in such a way is brought back into the circulation system of the elastic abrasive in any position, thereby 10-50% of the elastic abrasive circulating the circulation system is continuously or constantly (intermittently) recycled. Therefore the elastic abrasive circulating in the circulation system can always be maintained in a certain state to constantly maintain the processed state even in a case of long-time continuous ejection of the elastic abrasive.

Abrasive Grain Supplying Unit

As a configuration of an abrasive grain supplying unit 13 which introduces the abrasive grains to the mixing unit 11, any configuration may be used as long as it can constantly supply the abrasive grains to the mixing unit 11 at a previously set introduction amount. For example, the abrasive grain supplying unit 13 having a relatively simple structure that a bottom of a hopper storing the abrasive grains is provided with a predetermined-size hole or slit, and the abrasive grains passing through the hole or slit are sent to the mixing unit 11, or the like, may be provided.

For smoothly supplying the abrasive grains, the hopper storing the abrasive grains is preferably oscillated, and particularly in the case that abrasive grains having a grain size of smaller than #3000 (D50: 11 µm) are used, the abrasive grains cannot be transferred as they are due to strong cohesive force, thus ultrasonic vibration must be given.

Figure 5:
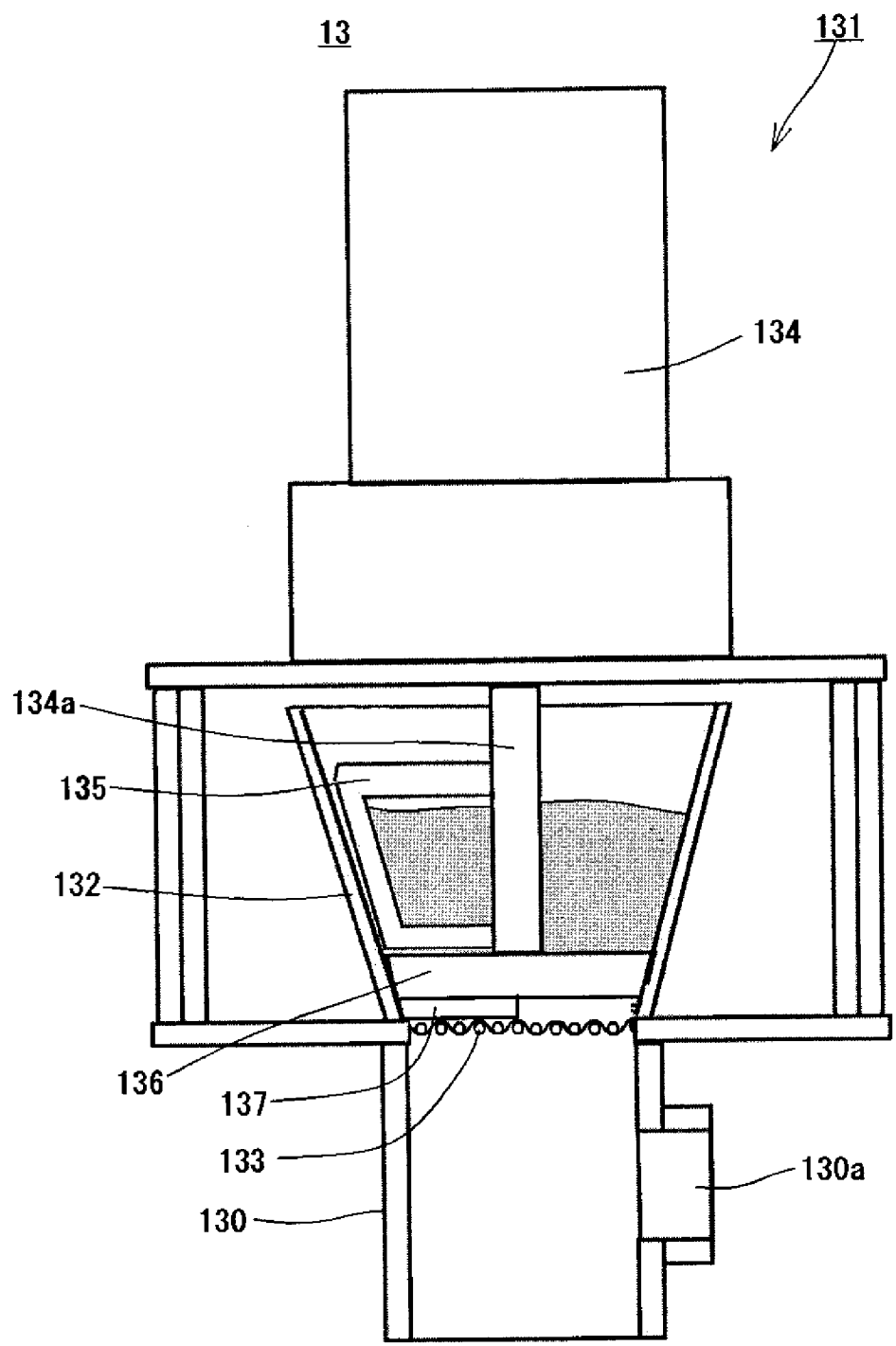
FIG. 5 shows a schematic view of the abrasive grain supplying unit.
Figure 6A:
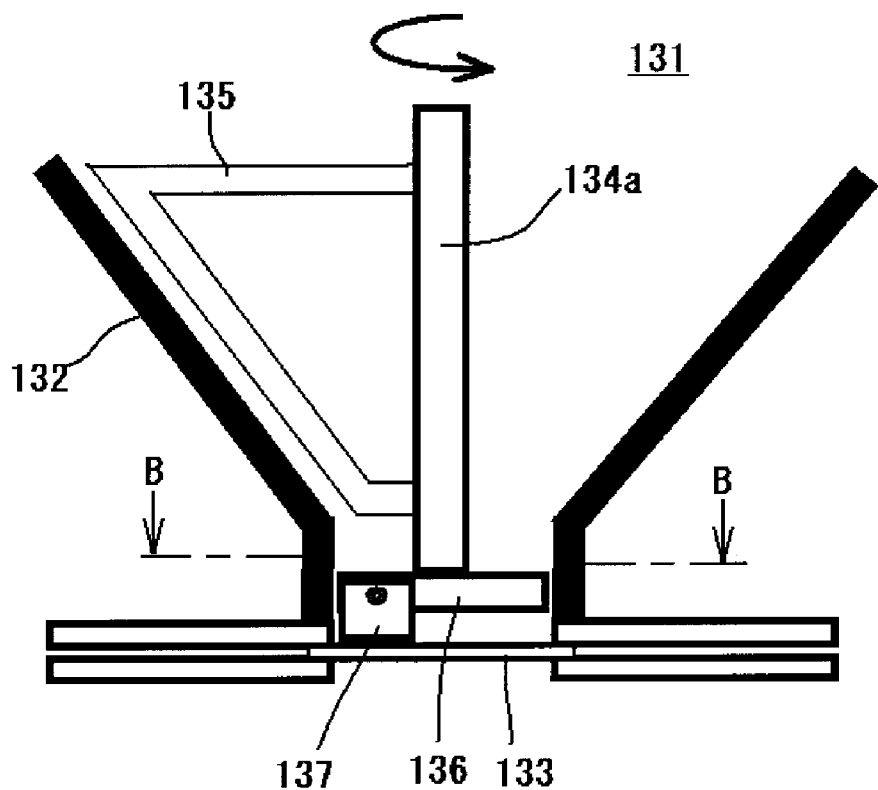
FIG. 6A is a sectional front view and FIG. 6B is a cross-sectional view taken along the line B-B in FIG. 6A.
Figure 6B:
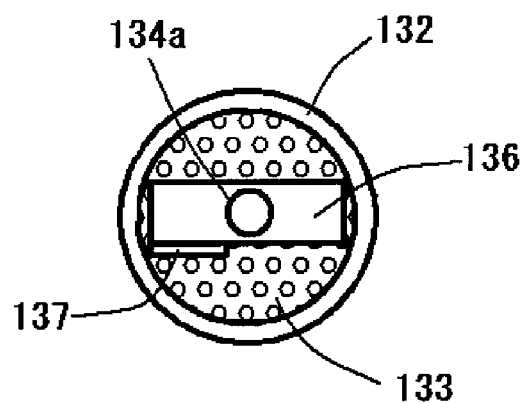

In the present embodiment, the abrasive grain supplying unit 13 includes an abrasive grain weighing means 131 shown in FIGS. 5 and 6 in order to accurately weigh and supply even such fine abrasive grains, particularly abrasive grains of #6000 (D50: 2 µm) or smaller with strong cohesive force.

The abrasive grain supplying unit 13 provided with the abrasive grain weighing means 131 is configured so that a screen 133 made of a punching metal or a mesh or the like with a large number of small holes of 0.1-2 mm is arranged below an inverted truncated cone shaped hopper 132 to allow the abrasive grains introduced into the hopper 132 to fall on the screen 133. The abrasive grain supplying unit 13 is also configured so that a rotation axis 134a of a stirring motor 134 located above the hopper 132 is provided with a stirring blade 135 rotating in the hopper 132 and a scraper 136 rotating on the screen 133 to allow them to rotate with rotation of the stirring motor 134.

The scraper 136 has a blade 137 brought into slidable contact with the surface of the screen 133 as the rotation of the scraper 136, and is configured so that the abrasive grains can fall from small holes formed in the screen 133 by the blade 137.

Accordingly, by rotating the stirring motor 134 in a state that the abrasive grains are delivered in the hopper 132, the abrasive grains in the hopper 132 are stirred by the stirring blade 135 and fallen on the screen 133.

The abrasive grains transferred into the small holes of the screen 133 by the blade 137 through the rotation of the scraper 136 pass through the small holes of the screen 133 and fall downward a small amount at a time.

Hence, the abrasive grain supplying unit 13 provided with the abrasive grain weighing means 131 with the above mentioned structure is configured so that the supplying amount of the abrasive grains can be increased by accelerating the rotational speed of the stirring motor 134, conversely, the supplying amount of the abrasive grains can be decreased by lowering the rotational speed of the stirring motor 134, thus the supplying amount of the abrasive grains can be changed by controlling the rotational speed of the stirring motor 134.

In such a way, an abrasive grain receiving unit 130 into which the abrasive grains passing through the screen 133 fallen is communicated with the abrasive grain sucking chamber 112 provided in the mixing unit 11 through the abrasive grain supplying tube 42 to introduce compressed air to the first air jetting unit 116 in the mixing unit 11. After the negative pressure is created in the abrasive grain sucking chamber 112, the abrasive grains are introduced into the mixing unit 11 together with outside air sucked from an outside air inlet 130a of the abrasive grain receiving unit 130.

Inspection Means and Controlling Means (Feedback Control)

Thus, the blasting device 1 of the present invention in which the abrasive grain supplying unit 13 is provided with the abrasive grain weighing means 131 capable of changing the introduction amount of the abrasive grains may be configured so that an inspection means 14 which measures the amount of the abrasive grains attached to the core of the recycled elastic abrasive obtained by the combining unit 12 is provided to adjust the amount of the abrasive grains to be introduced to the mixing unit 11 according to a feedback of inspection results obtained by the inspection means 14.

The attached amount of the abrasive grains can be measured as a ratio of a pixel number in areas attaching the abrasive grains and a pixel number in areas without the abrasive grains or the like e.g. on the basis of images obtained by photographing the surfaces of the recycled elastic abrasive particles picked up as samples from the obtained recycled elastic abrasive. However in the present embodiment, the amount of the attached abrasive grains is measured by a repose angle which is a piled angle of the recycled elastic abrasives piled in a cone shape.

That is, as the exposed area of an adhesive surface of the core becomes wide by changing the amount of the attached abrasive grains, the obtained recycled elastic abrasives tend to be adhered and aggregated each other. Meanwhile, as the exposed area of the adhesive surface of the core becomes small, the recycled elastic abrasives become hard to be aggregated each other. As a result, in the case that the abrasive grains are insufficiently attached to the core, accordingly the core is exposed, the repose angle is large. Therefore, a state of attachment of the abrasive grains to the surface of the core can be measured by measuring the repose angle of the recycled elastic abrasive.

As the inspection means 14 for measuring the repose angle, various sensors, CCD cameras, etc. can be used as one example. For example, the recycled elastic abrasives are piled on a circular plate disposed at a position which is hardly affected from the environment until the recycled elastic abrasives are spilled out of the circular plate, and the repose angle is measured on the basis of the images obtained by photographing the repose angle of the pile of the recycled elastic abrasives and the piled height of the recycled elastic abrasives.

In the illustrated embodiment, an inspection chamber 50 communicated with the blasting chamber 8 is provided, and the recycled elastic abrasive are fallen off and piled on an inspection plate 51 provided in the inspection chamber 50, then the recycled elastic abrasives spilled out from the inspection plate 51 are fallen into the blasting chamber 8 to return the recycled elastic abrasive to the circulation system of the abrasive, thereby the inspection step by the inspection means 14 can be carried out in a sequence of actions.

The repose angle of the recycled elastic abrasive measured by the inspection means 14 in such a way is transmitted to the controlling means 15.

The controlling means 15 is e.g. a microcontroller which controls a rotational speed of the stirring motor 134 of the abrasive grain supplying unit 13 on the basis of the repose angle received from the inspection means 14. On the basis of a correspondence relationship between the previously memorized repose angle and the rotational speed of the stirring motor 134, in the case that the measured repose angle is larger than the objective repose angle, the rotational speed of the stirring motor 134 is accelerated to increase the supplying amount of the abrasive grains in order that the measured repose angle is approximated to the objective repose angle for obtaining a recycle elastic abrasive with constant quality.

Modifications

The above-mentioned blasting device 1 of the present invention as described above has a structure that the device for recycling the elastic abrasive 10 is provided outside the circulation system of the abrasive provided in the blasting device 1 and the elastic abrasives recovered in the abrasive recovery unit 20 are partially recycled. However, for example, the blasting device 1 may be configured so that the above described mixing unit 11 and the combining unit 12 are provided in a flow channel from the abrasive recovery unit 20 to the abrasive ejecting means 30, and a total amount of the elastic abrasives recovered in the circulation system of the abrasive is subjected to the recycling step.

In the above descriptions, as one example, the device for recycling the elastic abrasive 10 is provided as one component of the blasting device 1. However, the above-described device for recycling the elastic abrasive 10 may be separated from the blasting device 1 and used alone as a device for manufacturing the elastic abrasive.

In this case, the recovered abrasive described as a subject to be recycled in the device for recycling the elastic abrasive 10 in the above embodiment should be replaced by an unused or used core then used.

EXAMPLES

Hereinafter, the results of a performance verification test for the blasting device of the present invention equipped with the device for recycling the elastic abrasive will be described.

Purpose of the Test

The test was carried out to confirm that a deterioration of the cutting performance can be prevented and the cutting performance can be stabilized for a long time by carrying our blasting using the blasting device of the present invention provided with the device for recycling the elastic abrasive.

Test Method

As elastic abrasives, abrasives ("Sirius Z" manufactured by Fuji Manufacturing CO., LTD.) with self-adhesive elastomer cores (average long diameter is 0.3-1.0 mm) to which diamond abrasive grains #10000 (D50: 0.6 µm) in the amount of 30% with respect to the weight of the core were attached were used. For the used abrasives, the abrasives used for 15 hours was used in Example 1, and the abrasive used for 10 hours was used in Example 2.

As the blasting device (Examples 1, 2) of the present invention, a commercial air-type blasting device ("SFFSRZ-2", "LDQSR-4", both were manufactured by Fuji Manufacturing CO., LTD.) as a basis of the device provided with the device for recycling the elastic abrasive described with reference to FIGS. 1 and 2 was used to carry out blasting for test pieces (however, feedback control was not carried out), and the change of the cutting amount relative to the processing time was measured.

As comparative examples (Comparative Examples 1, 2), a commercial blasting device without the device for recycling the elastic abrasive (the same as the blasting device used as the basis of the blasting device in Examples 1 and 2) is used to carry out blasting for test pieces, and the change of the cutting amount relative to the processing time was measured. In both Comparative Examples, the elastic abrasive began to be used from an unused state.

The processing conditions in each Example and Comparative Example are as shown below.

TABLE 1

Processing conditions in Example 1 and Comparative Example 1

|  |  | Example 1 | Comparative Example 1 |
|---|---|---|---|
| Device for use |  | SFFSRZ-2 (with recycling device) | SFFSRZ-2 (without recycling device) |
| Amount of the elastic abrasive (Amount of the abrasive delivered in the device) |  | 1000 g | 1000 g |
| Blasting condition | Blast gun | Suction type Nozzle diameter: 9 mm | Suction type Nozzle diameter: 9 mm |
|  | Ejection pressure | 0.3 MPa | 0.3 MPa |
|  | Ejection amount | 1800 g/min | 1800 g/min |
|  | Distance between the gun and the test piece | 20 mm | 20 mm |
|  | Ejection angle | 20° | 20° |
|  | Test piece | SUS304 (90 × 90 × 2 mm) | SUS304 (90 × 90 × 2 mm) |
| Recycle conditions | Pressure introduced to the mixing unit | 0.3 MPa | — |
|  | Recycled Amount | 185 g/min | — |
|  | Supplying amount of the abrasive grains | 0.015 g/min | — |

TABLE 2

Processing conditions in Example 2 and Comparative Example 2

|  |  | Example 2 | Comparative Example 2 |
|---|---|---|---|
| Device for use |  | LDQSR-4 (with recycling device) | LDQSR-4 (without recycling device) |
| Amount of the elastic abrasive (Amount of the abrasive delivered in the device) |  | 3000 g | 3000 g |
| Blasting condition | Blast gun | Direct pressure type Nozzle diameter: 10 mm | Direct pressure type Nozzle diameter: 10 mm |
|  | Ejection pressure | 0.04 MPa | 0.04 MPa |
|  | Ejection amount | 5000 g/min | 5000 g/min |
|  | Distance between the gun and the test piece | 20 mm | 20 mm |
|  | Ejection angle | 20° | 20° |
|  | Test piece | SUS304 (90 × 90 × 2 mm) | SUS304 (90 × 90 × 2 mm) |
| Recycle conditions | Pressure introduced to the mixing unit | 0.3 MPa | — |
|  | Amount of recycle | 500 g/min | — |
|  | Supplying amount of the abrasive grains | 0.075 g/min | — |

Test Results

Figure 7:
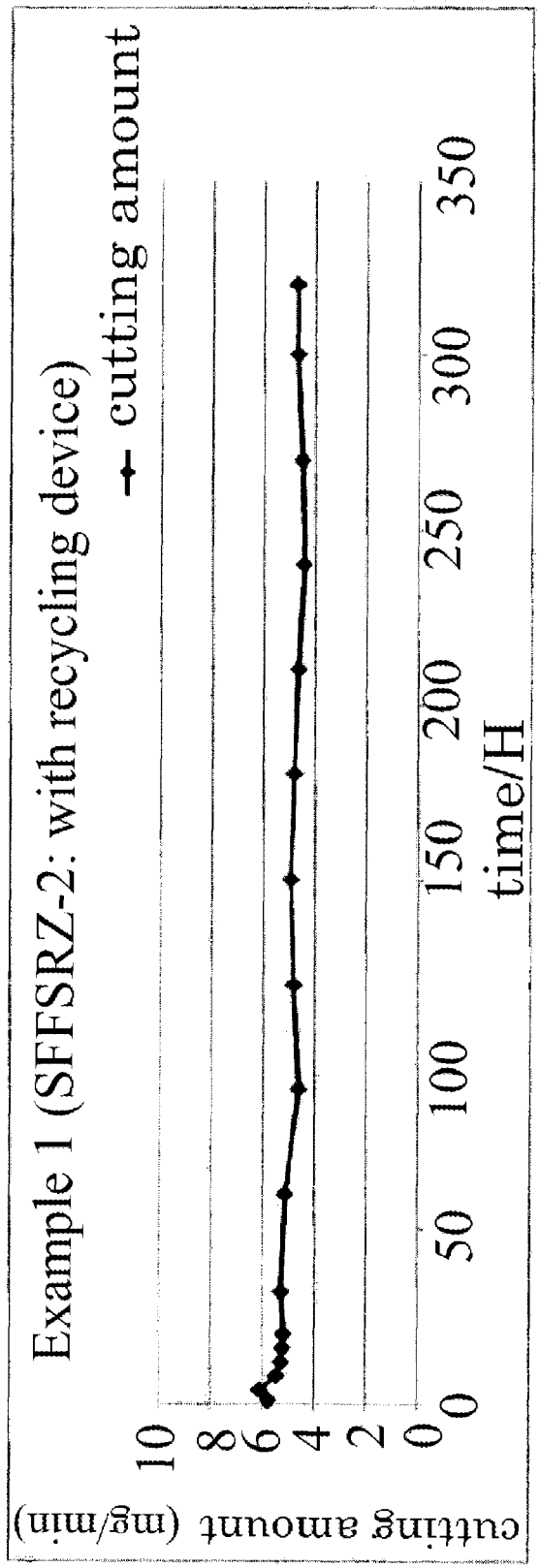
FIG. 7 shows a graph showing the change of the cutting amount relative to the ejection time in Example 1.
Figure 8:
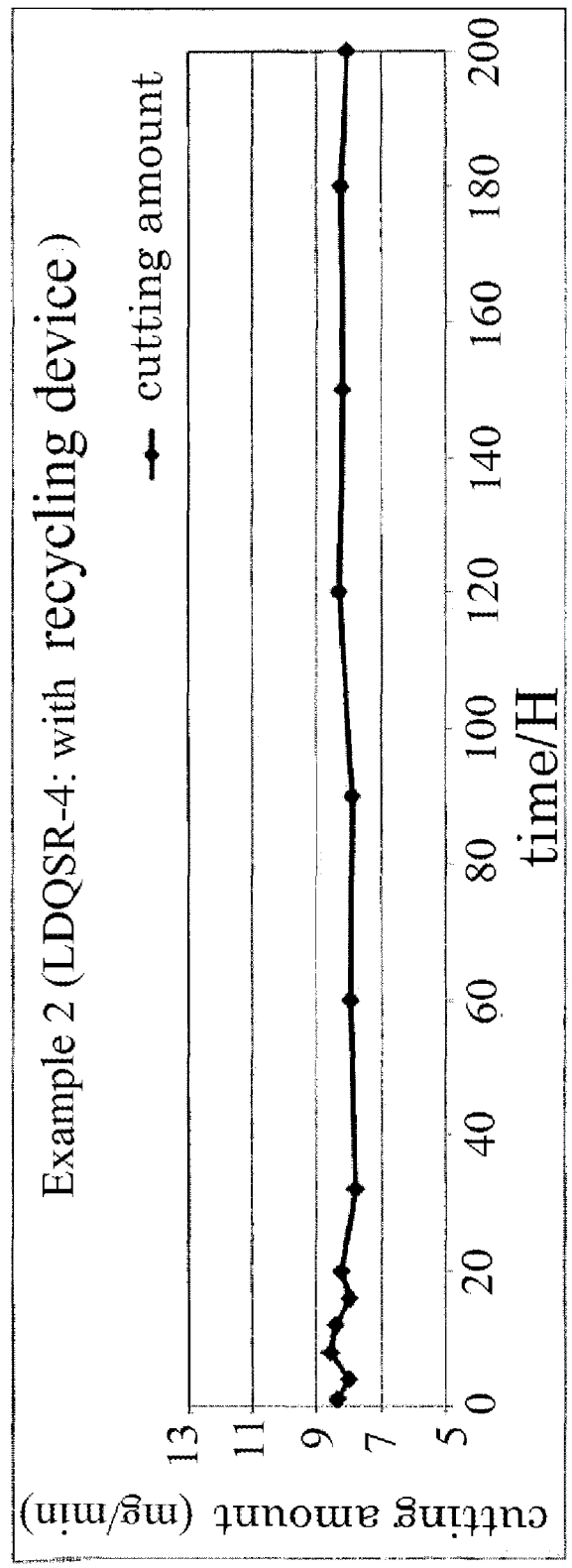
FIG. 8 shows a graph showing the change of the cutting amount relative to the ejection time in Example 2.
Figure 9:
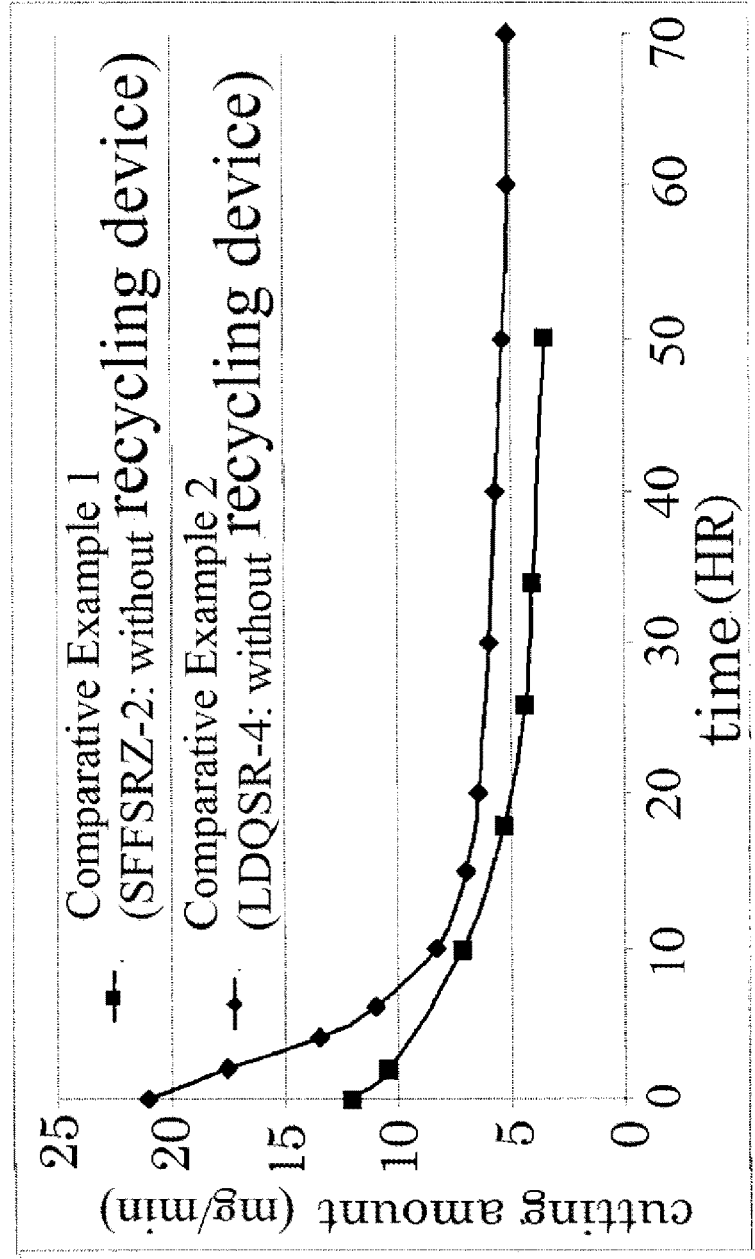
FIG. 9 shows a graph showing the changes of the cutting amounts relative to the ejection times in Comparative Examples (Comparative Example 1, 2)
Figure 10:
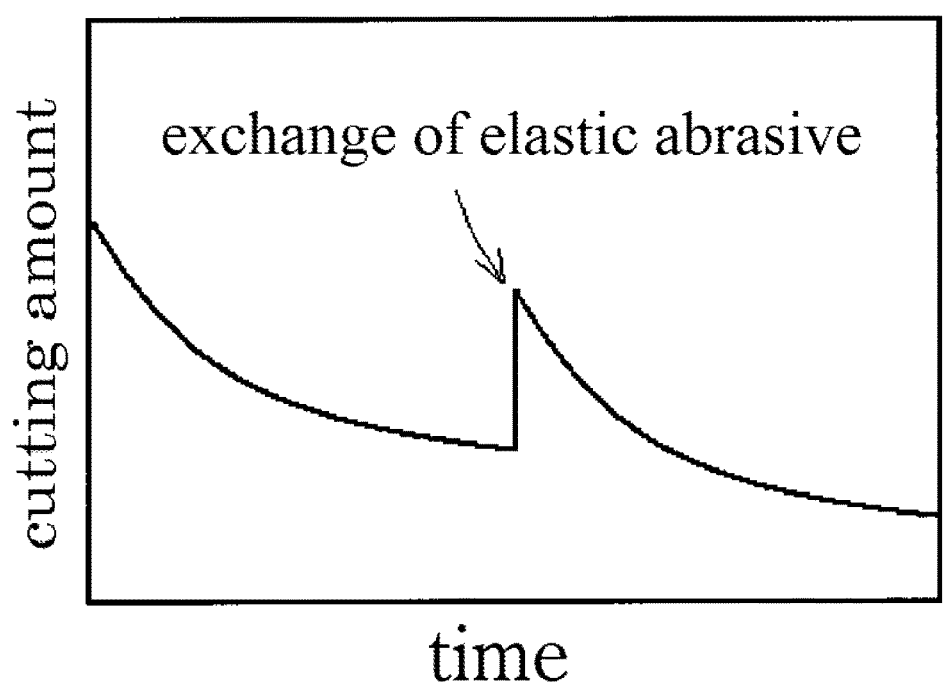
FIG. 10 shows an explanatory drawing showing a relationship between the ejection time and the cutting amount in conventional blasting using the elastic abrasive.

The relationship between the ejection time and the change of the cutting amount obtained from the results of the blasting test is shown in FIGS. 7 to 9. Note that FIGS. 7, 8 and 9 are test results of Example 1, Example 2 and Comparative Examples (Comparative Examples 1, 2) respectively.

As is clear from FIGS. 7 to 9, it was confirmed that the processing could be carried out at a constant cutting amount for a long time from the start of ejection to the completion of experiment (320 hours in Example 1, and 200 hours in Example 2) in the blasting using the blasting device of the present invention provided with the device for recycling the elastic abrasive (see FIGS. 7, 8).

In addition, the state of the elastic abrasive was observed after the experiment was terminated. According to the observation, abrasive grains were densely attached to the surface of the core in the elastic abrasive used in the blasting device of the present invention, and a definite difference from the elastic abrasive at the time of the start of use could not be confirmed.

From the above results, it could be confirmed that the elastic abrasive was preferably recycled by the device for recycling the elastic abrasive in the blasting device of the present invention.

On the other hand, in the blasting of Comparative Example 1 using an existing blasting device without the device for recycling the elastic abrasive, the cutting amount was considerably decreased in several hours after the start of processing, the cutting amount was decreased to more than half of the initial amount by use of 20 hours, and further continued to decrease to about one third by use of about 50 hours (see FIG. 9).

In Comparative Example 1, an adhesive substance on the core was adhered to the SUS plate as a test piece, the fluidity of the elastic abrasive became poor, and the elastic abrasives began to accumulate on the hopper portion in the processing chamber. Thereby the processing was terminated.

The elastic abrasive after use of 50 hours was taken out of the blasting device and its state was confirmed by an optical microscope. As a result, the abrasive grains were fallen off from the surface of the core, the core was partially exposed, the core was worn out by being adhered to the surface of the test piece or the like, thus reuse was impossible.

Also in Comparative Example 2, the cutting amount was decreased with time like the case in Comparative Example 1, and decreased to half by use of 8 hours. The cutting amount was decreased to one third in 30 hours.

In processing of 70 hours, the adhesive substance of the core was adhered to the surface of the workpiece, thus uniformly processed surface could not be obtained.

After the elastic abrasive was used for 70 hours and taken out of the blast chamber for observing the surface of the abrasive. By an optical microscope observation, it was confirmed that the abrasive grains were fallen off from the surface of the core and the core was partially exposed like the case in Comparative Example 1, thus reuse was impossible.

Thus the broadest claims that follow are not directed to a machine that is configure in a specific way. Instead, said broadest claims are intended to protect the heart or essence of this breakthrough invention. This invention is clearly new and useful. Moreover, it was not obvious to those of ordinary skill in the art at the time it was made, in view of the related art when considered as a whole.

Moreover, in view of the revolutionary nature of this invention, it is clearly a pioneering invention. As such, the claims that follow are entitled to very broad interpretation so as to protect the heart of this invention, as a matter of law.

It will thus be seen that the objects set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described;

What is claimed is:

1. A method for recycling elastic abrasives in a circulation-type blasting in which each elastic abrasive comprising a core made of an elastic material having adhesiveness at least on a surface of the core and abrasive grains attached to the surface of the core is ejected into a blasting chamber, then recovered and recycled thereby reused, thereby a circulation system of the elastic abrasives is formed, comprising:

a mixing step for mixing new abrasive grains and recovered elastic abrasives each of which having its respective core and an exposed part where abrasive grains have fallen off from its respective surface of its respective core in a compressed gas flow by introducing then joining a predetermined amount of the new abrasive grains into the compressed gas flow to generate a mixed flow, then introducing and joining a predetermined amount of the recovered elastic abrasives the mixed flow to generate a solid-gas biphase flow for evenly attaching the new abrasive grains to each of the exposed part of the surface of the core without aggregation of the core; and a combining unit composed of a conduit having a bent space formed into a curved shape of which radius of curvature is gradually decreased and curvature is increased as extending from an upstream side to a downstream side to which the solid-gas biphase flow including the recovered elastic abrasives each of which has the core having the surface to which the new abrasive grains are attached in the mixing unit is introduced then the new abrasive grains attached to each of the surface of the core of the recovered elastic abrasive are pressed and combined to each of the surface of the core of the recovered elastic abrasive to obtain recycled elastic abrasives.

2. The method for recycling the elastic abrasives according to claim 1 further comprising an inspection step for measuring an amount of the abrasive grains attached to the surface of the core of the elastic abrasive recovered through the combining step, wherein the amount of the abrasive grains to be joined in the mixing step is adjusted so that the amount of the abrasive grains to be measured in the inspection step approximates to a predetermined target amount of attachment.

3. The method for recycling the elastic abrasives according to claim 2, wherein the amount of the abrasive grains attached to the surface of the core in the inspection step is measured by measuring a repose angle of the recovered elastic abrasive.

4. The method for recycling the elastic abrasives according to claim 1, wherein the solid-gas biphase flow is generated by introducing the predetermined amount of the recovered elastic abrasives into the compressed gas to generate a mixed flow, then introducing and joining the predetermined amount of new abrasive grains into the mixed flow of the recovered elastic abrasives and the compressed gas.

5. A device for recycling elastic abrasives incorporated in a circulation-type blasting device composed of a blasting chamber including an abrasive ejecting device for ejecting the elastic abrasives each of which comprising a core made of an elastic material having adhesiveness at least on a surface of the core and abrasive grains attached to the surface of the core and a circulation system of the elastic abrasives for circulating the elastic abrasives from the blasting chamber to the abrasive ejecting device through an abrasive recovery unit, the device for recycling the elastic abrasives comprising:

a mixing unit for mixing a predetermined amount of new abrasive grains and recovered elastic abrasives which are recovered from the abrasive recovery unit and each of which having its respective core and an exposed part where abrasive grains have fallen off from its respective surface of its respective core by introducing then joining the new abrasive grains into the compressed gas to generate a mixed flow, then introducing and joining a predetermined amount of the elastic abrasives which are recovered from the abrasive recovery unit in the mixed flow to generate a solid-gas biphase flow for evenly attaching the new abrasive grains to each of the exposed part of the surface of the core without aggregation of the core, and attaching the new abrasive grains to each of the exposed part of the surface of the core of the recovered elastic abrasive; and a combining unit composed of a conduit having a bent space formed into a curved shape of which radius of curvature is gradually decreased and curvature is increased as extending from an upstream side to a downstream side to which the solid-gas biphase flow including the recovered elastic abrasives each of which has the core having the surface to which the new abrasive grains are attached in the mixing unit is introduced then the new abrasive grains attached to each of the surface of the core of the recovered elastic abrasive are pressed and combined to each of the surface of the core of the recovered elastic abrasive to obtain recycled elastic abrasives.

6. The device for recycling the elastic abrasives according to claim 5 further comprising:

a measuring device for measuring an amount of the abrasive grains attached to the surface of the core of the elastic abrasive obtained by the combining unit;

an abrasive grain regulator capable of changing a supplying amount of the abrasive grains to the mixing unit; and a controller for controlling the supplying amount of the abrasive grains by the abrasive grain regulator so that the amount of the abrasive grains to be measured by the measuring device approximates to a predetermined target amount of attachment.

7. The device for recycling the elastic abrasives according to claim 6, wherein the measuring device measures a repose angle of the elastic abrasive as the amount of the abrasive grains attached to the surface of the core.

8. The device for recycling the elastic abrasives according to claim 5 whether the mixing unit comprises:

a first body in which an abrasive grain sucking chamber communicating with an abrasive grain supplying unit for constantly supplying the predetermined amount of new abrasive grains is formed;

a second body in which a recovered-abrasive sucking chamber communicating with the abrasive recovery unit is formed, the second body being coupled to the first body through an intermediate housing;

a first air jetting unit with its rear end communicated with the compressed air source and its front end inserted into the abrasive grain sucking chamber of the first body; and a second air jetting unit with its rear end directed at the front end of the first air jetting unit and its front end inserted into the recovered-abrasive sucking chamber, wherein the compressed gas flow from the compressed gas source is introduced into the first air jetting unit, the compressed gas is ejected from the front end of the first air jetting unit to the rear end of the second air jetting unit, then negative pressure is created in the abrasive grain sucking chamber by ejection of the compressed gas flow, the abrasive grains from the abrasive grain supplying unit is sucked into the abrasive grain sucking chamber, and joined or introduced in compressed gas flow ejected from the front end of the first air jetting unit then introduced into the second air jetting unit, and the mixed flow of the new abrasive grains and the compressed gas flow introduced into the second air jetting unit is ejected in the recovered-abrasive sucking chamber toward the outlet of the mixing unit, thereby the negative pressure is created in the recovered-abrasive sucking chamber, and the predetermined amount of the elastic abrasives recovered in the abrasive recovery unit are introduced into the recovered-abrasive sucking chamber and joined or introduced in the mixed flow containing the abrasive grains, then ejected from the mixing unit.

9. The device for recycling elastic abrasives according to claim 5, wherein the solid-gas biphase flow is generated by introducing the predetermined amount of the recovered elastic abrasives into the compressed gas to generate a mixed flow, then introducing and joining the predetermined amount of new abrasive grains into the mixed flow of the recovered elastic abrasives and the compressed gas.

* * * * *